United States Patent [19]

Misaizu et al.

[11] Patent Number: 5,041,812
[45] Date of Patent: Aug. 20, 1991

[54] RESERVOIR WITH A SIDE MOUNTED FLOAT

[75] Inventors: Hidenori Misaizu; Shinichi Okada, both of Ueda, Japan

[73] Assignee: Nissin Kogyo Kabushiki Kaisha, Ueda, Japan

[21] Appl. No.: 522,417

[22] Filed: May 10, 1990

Related U.S. Application Data

[63] Continuation of Ser. No. 259,836, Oct. 18, 1988, abandoned.

[30] Foreign Application Priority Data

Oct. 19, 1987 [JP] Japan .................. 62-159648[U]
Oct. 19, 1987 [JP] Japan .................. 62-159649[U]

[51] Int. Cl.$^5$ ............................................. G08B 21/00
[52] U.S. Cl. ............................. 340/450.3; 340/624; 200/84 C; 73/314; 73/307
[58] Field of Search ............... 340/624, 450, 450.1, 340/450.2, 450.3; 116/110, 228; 200/84 C, 84 R, 84 A, 84 B; 73/307, 314, 319, 322.5, 305, 306, 315–316; 137/558

[56] References Cited

U.S. PATENT DOCUMENTS

| | | | |
|---|---|---|---|
| 598,985 | 2/1898 | Fleming | 73/307 |
| 1,284,616 | 11/1918 | Ditzler et al. | 200/84 A |
| 2,744,177 | 5/1956 | Barber | 340/624 |
| 3,258,968 | 7/1966 | Woodcock | 116/228 |
| 3,603,926 | 9/1971 | Kimura | 340/624 |
| 3,715,539 | 2/1973 | Silberg et al. | 340/450 |
| 3,750,124 | 1/1973 | Barnes et al. | 340/450.3 |
| 3,934,103 | 1/1976 | Walstra | 340/450 |
| 4,057,700 | 11/1977 | Nakashima | 200/84 C |
| 4,499,348 | 2/1985 | Gismervik et al. | 200/84 C |
| 4,605,038 | 8/1986 | Tchitdjian | 200/84 C |
| 4,771,272 | 9/1988 | Barnes | 340/624 |

Primary Examiner—Joseph A. Orsino
Assistant Examiner—Jill Jackson
Attorney, Agent, or Firm—Armstrong, Nikaido Marmelstein, Kubovcik & Murray

[57] ABSTRACT

A reservoir, provided with a device for warning when the level of an operation fluid to be supplied to a fluid pressure master cylinder drops below a given level, comprises a fluid tank for storage of the operation fluid and a float chamber with an upper wall provided on the side portion of the fluid tank. A reed switch for the fluid level drop warning device is provided at the lower portion of the float chamber, and a float having a magnet is retained in the float chamber. A partition for restricting the movement of the float is detachably mounted at the communicating section between the fluid tank and float chamber. This arrangement facilitates the mounting and replacement of the float and reed switch.

7 Claims, 4 Drawing Sheets

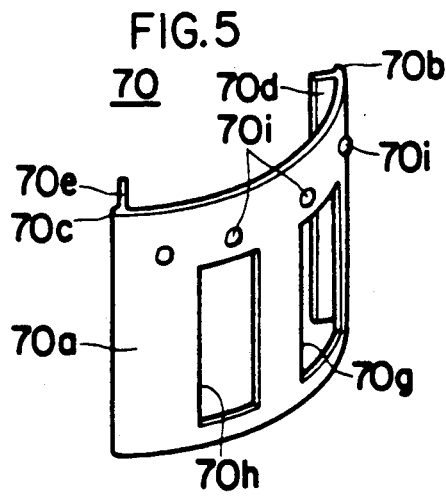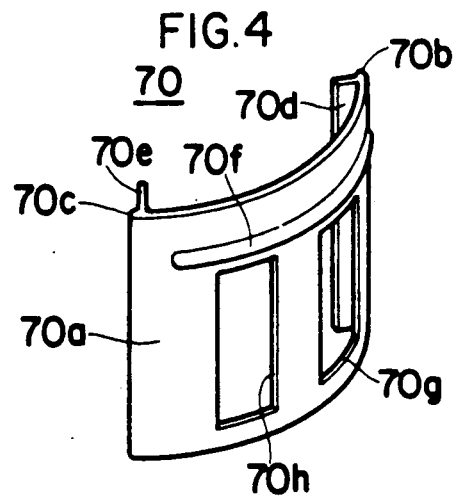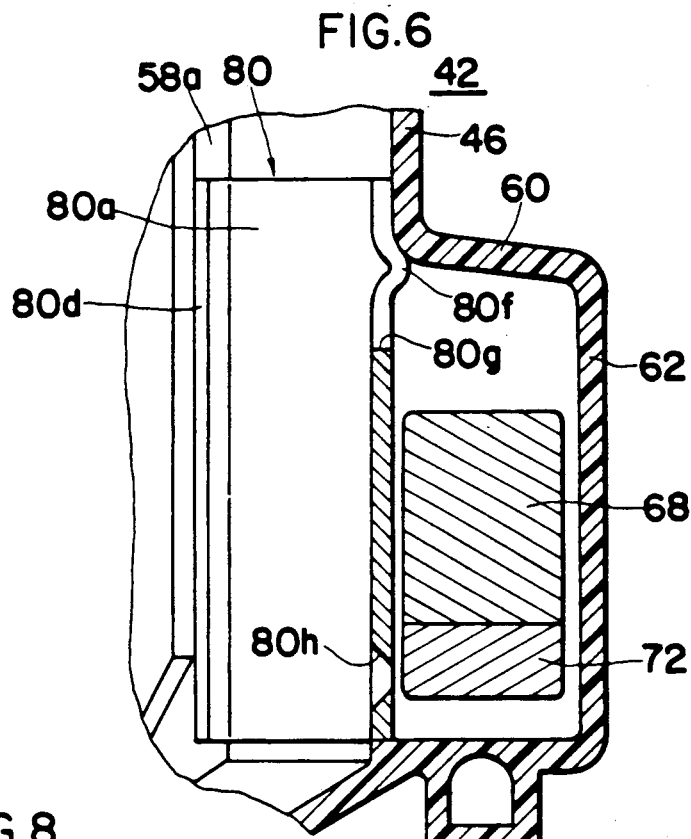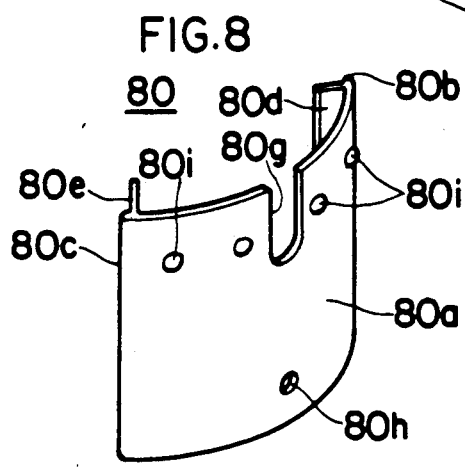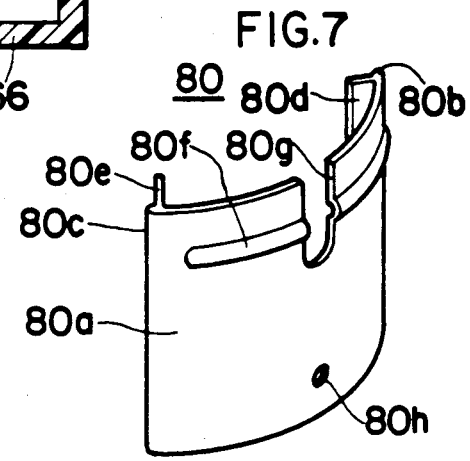

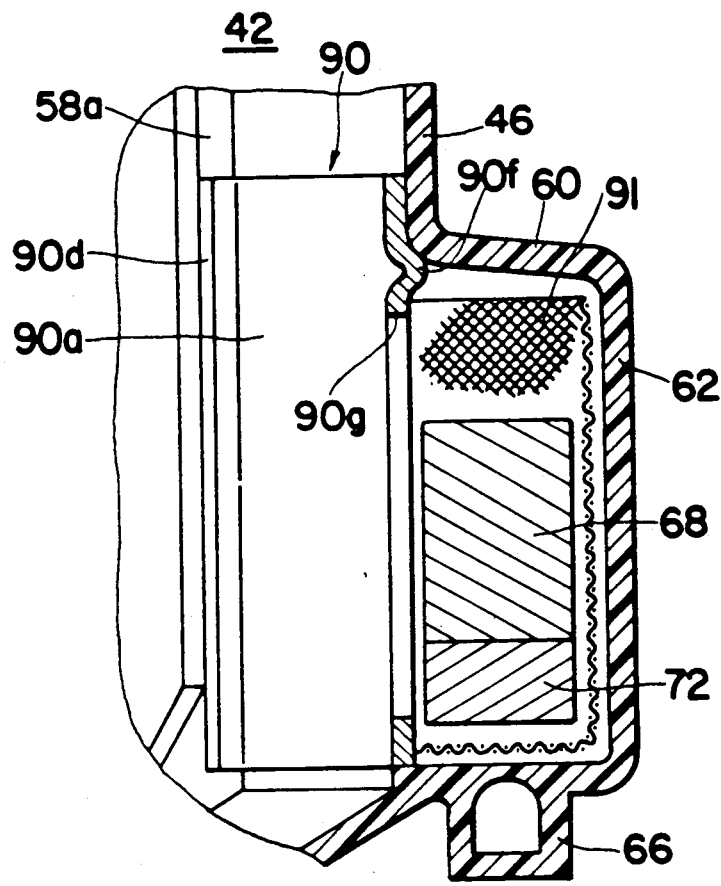
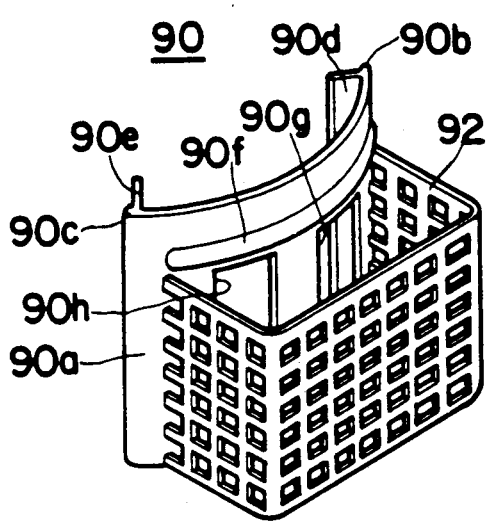
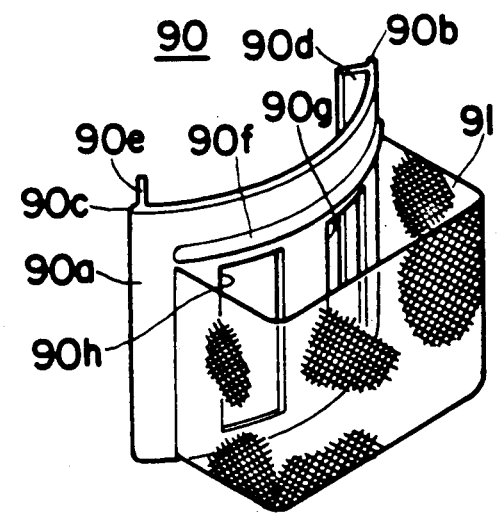

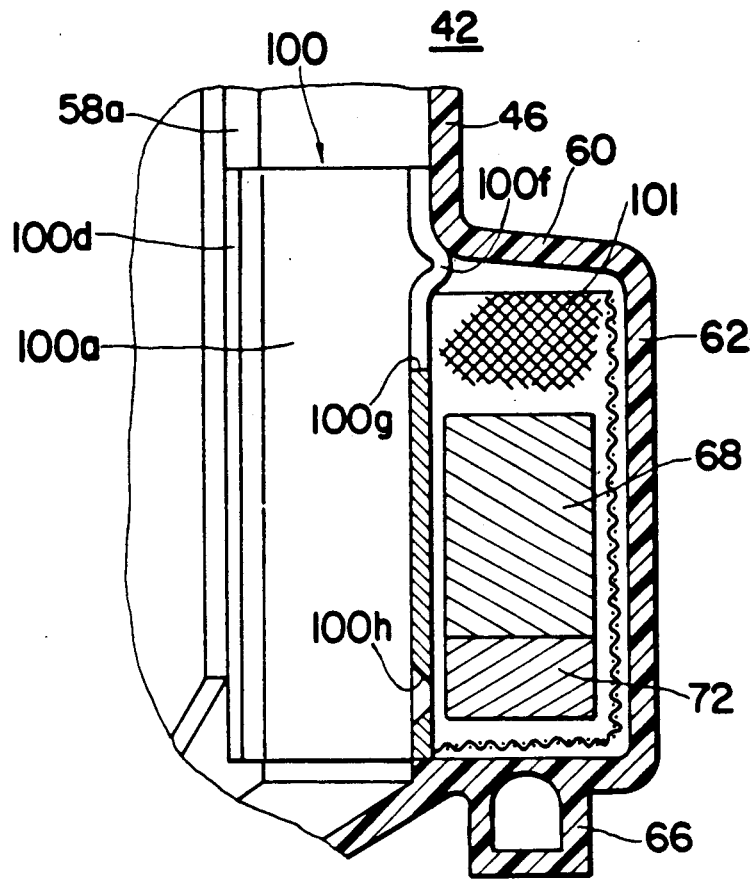
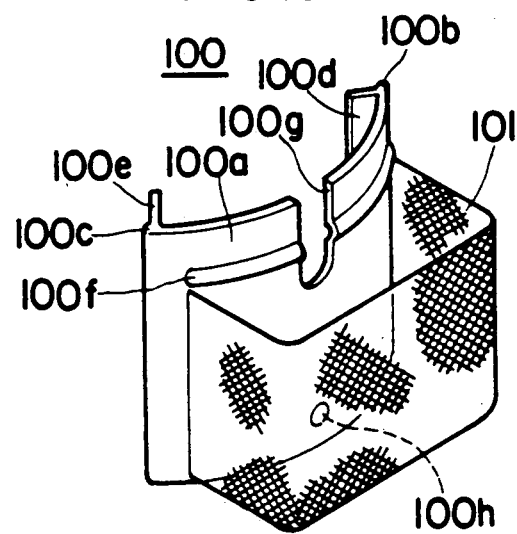
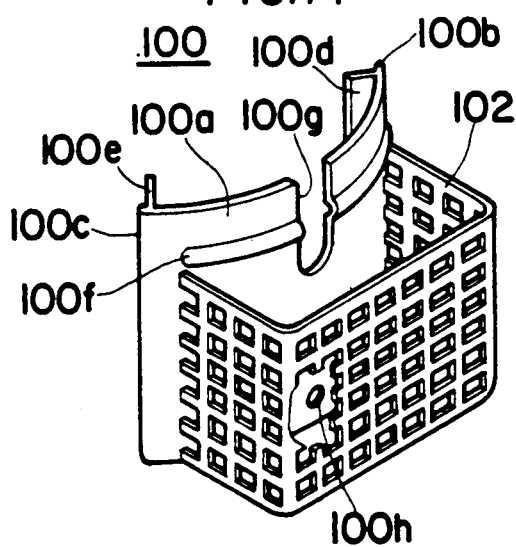

RESERVOIR WITH A SIDE MOUNTED FLOAT

This application is a continuation of application Ser. No. 259,836, filed Oct. 18, 1988, now abandoned.

BACKGROUND OF THE INVENTION

1. Field of the Invention

The present invention relates to a reservoir for storage of an operation fluid that is to be supplied to a fluid pressure master cylinder, etc., and, more particularly, to a reservoir provided with a device for warning when the level of an operation fluid drops to or below a given level.

2. Description of the Related Art

One type of a reservoir with a fluid level drop warning device comprises a float chamber having its top wall provided at the side section of a fluid tank, a float having a magnet in the float chamber for detecting the level of an operation fluid, and a reed switch operable by the magnet.

Such a reservoir is disclosed in, for example, Japanese Utility Model Disclosure No. 57-28688. In the reservoir, a tubular member containing a reed switch is disposed within, and hanging vertically from the top wall of, a float chamber provided at the side section of a fluid tank, and a float having a magnet is fitted on the tubular member freely movable in vertical directions. This arrangement, however, requires that a seal member be attached between the tubular member and the top wall of the float chamber. Further, since the tubular member is fitted from the bottom side of the fluid tank and attached to the top wall of the float chamber before mounting the reservoir to the body of the master cylinder, maintenance of the reed switch and float after the mounting of the reservoir cannot be executed. Furthermore, the reed switch and float cannot be replaced, unless the operation fluid is drained from the reservoir and the reservoir is detached from the master cylinder.

Japanese Utility Model Disclosure No. 60-58473 discloses another type of reservoir in which a retainer tube for a reed switch is provided upright and integral with the bottom of a float chamber that is provided at a side portion of a fluid tank. With this structure, however, in order to form the retainer tube and mount the float on the tube, it is necessary to initially form separable the top and bottom portions of the fluid tank and float chamber and then tightly attach the upper and bottom portions together after the float is fitted freely floatable on the retainer tube. After the tight attachment, therefore, the float cannot be replaced.

SUMMARY OF THE INVENTION

Accordingly, it is an object of this invention to provide a reservoir which ensures easy mounting and replacement of a float and a reed switch.

To achieve the object, according to one aspect of this invention, there is provided a reservoir comprising:

a fluid tank having an upper opening closed water-tight by a diaphragm;

a float chamber with an upper wall, formed at a side portion of the fluid tank;

a reed switch for a fluid level drop warning device, disposed at a lower portion of the float chamber;

a float with a magnet, accommodated in the float chamber; and a partition, detachably provided at a communicating section between the fluid tank and the float chamber, for restricting the float from moving out to the fluid tank.

The above arrangement permits the partition to be detached from the float chamber for easier disposition and replacement of the float in the float chamber.

Since the fluid tank is separated from the float chamber by the partition, the float will not move out to the fluid tank.

In addition, the float is disposed alone in the float chamber so that it can smoothly float in the vertical directions as the fluid level changes, irrespective of vibration and inclination of a vehicle during its run.

BRIEF DESCRIPTION OF THE DRAWINGS

FIGS. 1 through 4 illustrate the first embodiment of this invention, in which FIG. 1 is a front cross-sectional view of a reservoir mounted to a tandem type of fluid pressure master cylinder, FIG. 2 is a cross-sectional view of FIG. 1 along the line II—II, FIG. 3 is a cross-sectional view of FIG. 1 along the line III—III, and FIG. 4 is a perspective view of a partition for restricting the of a float;

FIG. 5 is a perspective view of a float-movement restricting partition according to the second embodiment;

FIGS. 6 and 7 illustrate the third embodiment of this invention, with FIG. 6 being a cross-sectional view illustrating a float-movement restricting partition in a properly set state, and FIG. 7 being a perspective view of the partition;

FIG. 8 is a perspective view of a float-movement restricting partition according to the fourth embodiment;

FIGS. 9 and 10 illustrate the fifth embodiment of this invention, with FIG. 9 being a cross-sectional view illustrating a float-movement restricting partition mounted to a reservoir and FIG. 10 being a perspective view of the partition having a float retainer case;

FIG. 11 is a perspective view of a float-movement restricting partition having a float retainer case according to the sixth embodiment;

FIGS. 12 and 13 illustrate the seventh embodiment of this invention, with FIG. 12 being a cross-sectional view illustrating a float-movement restricting partition mounted to a reservoir and FIG. 13 being a perspective view of the partition having a float retainer case; and FIG. 14 is a perspective view of a float-movement restricting partition having a float retainer case according to the eighth embodiment.

DETAILED DESCRIPTION OF THE PREFERRED EMBODIMENT

Preferred embodiments of this invention will be described below with reference to the accompanying drawings.

Figure 1:
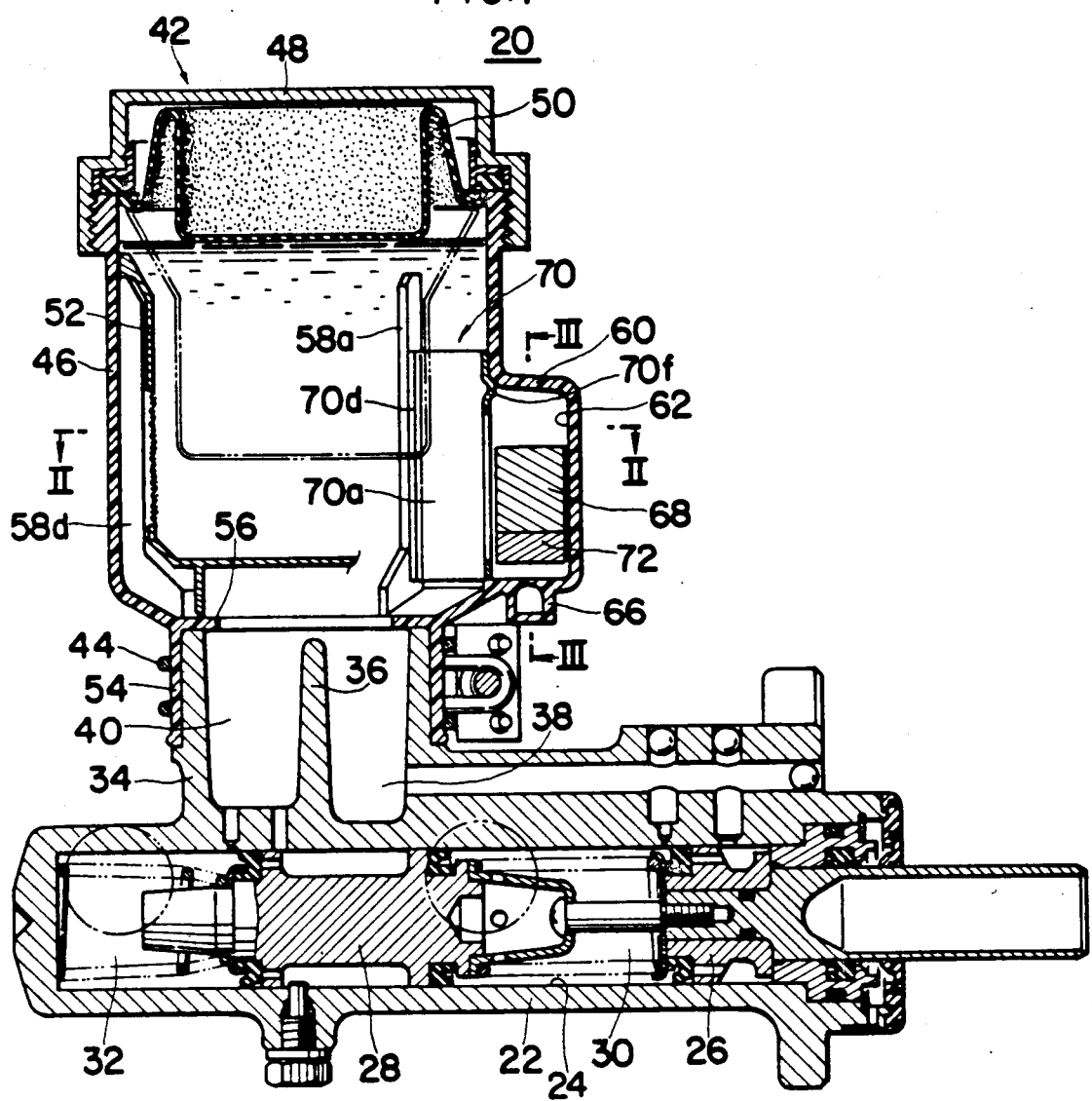
Figure 3:
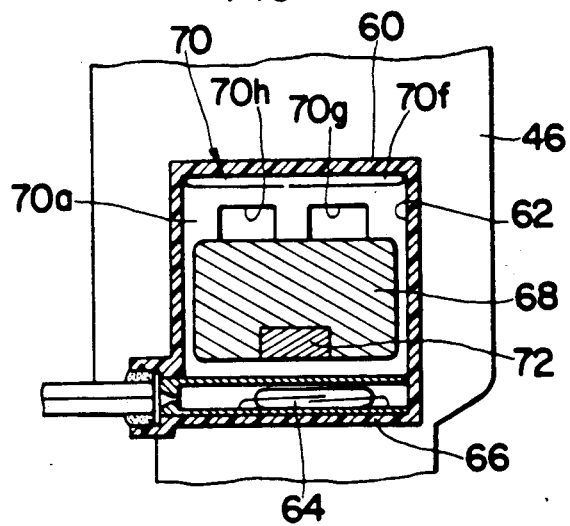
Figure 2:
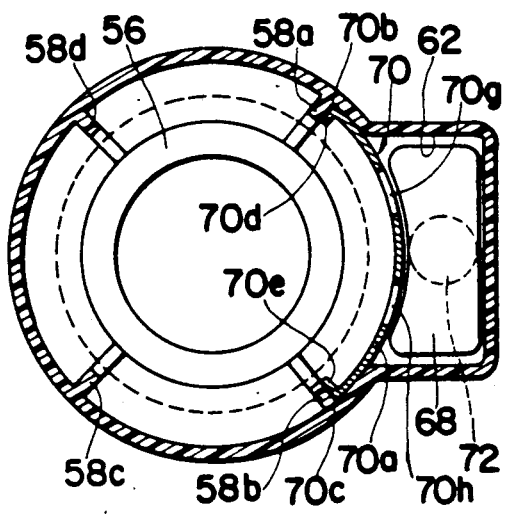

FIGS. 1 through 4 illustrate the first embodiment of this invention; a master cylinder 20 has a bore 24 formed within a body 22. In the bore 24 are fitted a primary piston 26 and a secondary piston 28 in a water-tight and movable manner. A first fluid pressure chamber 30 is formed between the primary and secondary pistons 26 and 28, and a second fluid pressure chamber 32 at the front of the secondary piston 28. An annular boss section 34 for attachment of a reservoir is provided integral with that portion of the body 22 which is above the secondary piston 28, and has its interior separated into a first fluid retainer chamber 38 and a second fluid retainer chamber 40 by a separation wall 36.

A reservoir 42, which is tightly mounted to the boss section 34 by means of a band 44, comprises a nearly cylindrical fluid tank 46 made of a synthetic resin, a cap 48 disposed on an upper opening of the fluid tank 46, a diaphragm 50 disposed between the cap 48 and the upper opening of the fluid tank 46 for closing that opening water-tight, and a strainer 52 provided in the fluid tank 46.

The fluid tank 46 has a mounting section 54 formed integral therewith which is adapted to be mounted to the boss section 34. The fluid tank 46 also has a jig receiver 56 for receiving an operation fluid compressing jig (not shown), which receiver is formed around a bottom opening of the fluid tank 46, and has an internal side wall provided at equal intervals with four vertical ribs 58a, 58b, 58c and 58d for guiding the jig.

A float chamber 62 having an upper wall 60 is protrusively formed on that side wall of the fluid tank 46 which is located between the vertical ribs 58a and 58b, and extends from the middle section to the bottom section of the tank. At the bottom of the float chamber 62 is formed a retainer 66 for a reed switch for a fluid level drop warning device.

A communicating section between the fluid tank 46 and the float chamber 62 is separated by a partition 70 for restricting the movement of a float 68.

The float chamber 62 retains the float 68 that has a magnet 72 provided at its bottom, and has such a height to permit the float 68 to vertically move with a change in level of the operation fluid in the chamber 62.

The partition 70 is formed of a non-magnetic material, such as a synthetic resin, in a plate shape. The partition 70 has a curved wall 70a with the same curvature as the side wall of the fluid tank 46, left and right edge portions 70b and 70c, holders 70d and 70e protruding from the respective side edge portions 70b and 70c toward the fluid tank 46, and a stopper projection 70f. The edge portions 70b and 70c and holders 70d and 70e respectively abut on the vertical ribs 58a and 58b. The stopper projection 70f is formed at, and along the width of, the upper portion of the wall 70a on the side of the float chamber 62. This stopper projection 70f is engaged with the top wall 60 of the float chamber 62 to restrict the vertical movement of the partition 70. Below the stopper projection 70f are provided vertically-elongated openings 70g and 70h in parallel, which permits the fluid tank 46 to communicate with the float chamber 62. These openings 70g and 70h are formed in a size not to permit the float 68 to pass therethrough.

FIG. 5 illustrates the partition 70 according to the second embodiment, which has a plurality of hemispheric stopper projections 70i formed its the upper portion on the side of the float chamber 62, in place of the stopper projection 70f used in the first embodiment.

According to these two embodiments, since the float 68 is fitted in the float chamber 62 and the partition 70 is mounted at the communicating section between the fluid tank 46 and float chamber 62, it is easy to dispose or replace the float 68 by detaching the partition 70 from the communicating section. Further, the openings 70g and 70h of the wall 70a are vertically elongated, the float 68 can make smooth vertical movement within the float chamber 68 with a change in amount of the operation fluid in the chamber 68 without catching on the openings 70g and 70h, and will not get in the fluid tank 46. This does not therefore prevent the downward movement of the diaphragm 50. Furthermore, the float 68 need not be removed at the time of supplying the operation fluid compressed with a high pressure, and this process becomes easier.

FIGS. 6 and 7 illustrate the third embodiment of this invention, in which a partition 80 provided at the communicating section between the fluid tank 46 and float chamber 62 includes a wall 80a, side edge portions 80b and 80c, holders 80d and 80e, and a stopper projection 80f, as per the first embodiment. At the upper center portion of the wall 80a is a U-shaped opening 80g formed extending from the upper edge of the wall 80a to below the stopper projection 80f. At the lower center portion of the wall 80a is formed a through hole 80h with a funnel shape which has a larger diameter on the side of the fluid tank 46 than on the side of the float chamber 62.

FIG. 8 illustrates the fourth embodiment of this invention, in which hemispherical stopper projections 80i are provided on the back surface of the wall 80a of the partition 80 in place of the stopper projection 80f of the third embodiment.

According to the third and fourth embodiments, because of the U-shaped opening 80g and the funneled through hole 80h formed in the wall 80a, even when the reservoir 42 is momentarily inclined to the left in FIG. 6 due to vibration or the like during a run of a vehicle, the flow of the operation fluid from the float chamber 62 to the fluid tank 46 is slow since the the through hole 80h has a smaller diameter on the side of the chamber 62. This restricts the rapid downward movement of the float 68 to thereby reduce the possible erroneous operation of the reed switch 64.

FIGS. 9 and 10 illustrate the fifth embodiment of this invention, in which a partition 90 includes a wall 90a, side edge portions 90b and 90c, holders 90d and 90e, a stopper projection 90f, and vertically-elongated openings 90g and 90h as per the first embodiment. At the lower portion of the stopper projection 90f is integrally provided a meshed, basket-like float retainer case 91 which has an upper opening. This case 91 retains the float 68 and is disposed in the float chamber 62.

FIG. 11 illustrates the sixth embodiment of this invention, in which a lattice, basket-like float retainer case 92 with its upper portion open is integrally provided on the partition 90 in place of the meshed case 91 of the fifth embodiment.

FIGS. 12 and 13 illustrates the seventh embodiment of this invention, in which a partition 100 includes a wall 100a, side edge portions 100b and 100c, holders 100d and 100e, a stopper projection 100f, a U-shaped opening 100g and a funneled through hole 100h, as per the third embodiment. A meshed, basket-like float retainer case 101 having its upper portion open is integrally provided on the wall 100a on the side of the float chamber 62, as per the fifth embodiment.

FIG. 14 illustrates the eighth embodiment of this invention, in which a lattice, basket-like float retainer case 102 with its upper portion open is integrally provided on the partition 100 in place of the meshed case 101 of the seventh embodiment.

According to the fifth to eighth embodiments, since the partition 90 or 100 is mounted to the communicating section between the fluid tank 46 and float chamber 62 after the float 68 is retained in the float retainer case 91, 92, 101 or 102, it is possible to prevent the float 68 from being left uninstalled. In addition, since the float 68 is mounted or detached together with the float retainer case 91, 92, 101 or 102, the number of necessary assembling steps can be reduced.

Needless to say, this invention is in no way restricted to the above particular embodiments, but can be modified in various manners within the scope and spirit of the invention.

What is claimed is:

1. A reservoir comprising:
   a cylindrical fluid tank having an upper opening closed water-tight by a diaphragm, said cylindrical fluid tank having a main portion and a protrusion, said protrusion integrally formed by a cylindrical sidewall of said fluid tank projecting outward from said main portion;
   a reed switch for a fluid level drop warning device, disposed at a lower portion of said protrusion;
   a float with a magnet, accommodated in said protrusion; and
   a partition, detachably provided at a communicating section between said main portion of said fluid tank and said protrusion, said partition restricting said float from moving out of said protrusion and into said main portion.

2. The reservoir according to claim 1, wherein said partition has a vertically-elongated opening for permitting fluid from said main portion of said cylindrical fluid tank to flow into said protrusion.

3. The reservoir according to claim 1, wherein said partition has an opening formed at an upper portion thereof for permitting said fluid in said main portion of said cylindrical fluid tank to communicate with said protrusion, and a funneled through hole formed at a lower portion thereof, said funneled through hole having a larger diameter on a side of said main portion of said cylindrical fluid tank than on a side of said protrusion.

4. The reservoir according to claim 1, wherein said partition has a stopper projection formed at an upper portion and along a width thereof on a side of said protrusion, said stopper projection being engaged with an inside surface of said cylindrical sidewall at a point where said protrusion starts to project outward from said cylindrical sidewall.

5. The reservoir according to claim 1, wherein said partition has a plurality of stopper projections formed at an upper portion thereof on a side of said protrusion, said stopper projections being engaged with an inside surface of said cylindrical sidewall at a point where said protrusion starts to project outward from said cylindrical sidewall.

6. The reservoir according to claim 1, wherein said partition has a meshed, basket-like float retainer case provided thereon, for retaining said float in a vertically movable manner within said protrusion.

7. The reservoir according to claim 1, wherein said partition has a lattice, basket-like float retainer case provided thereon, for retaining said float in a vertically movable manner within said protrusion.

* * * * *